United States Patent Office.

FRANKLIN G. HOLLAND, OF WASHINGTON, DISTRICT OF COLUMBIA.

Letters Patent No. 80,177, dated July 21, 1868; antedated July 8, 1868.

IMPROVED METALLIC PAINT.

The Schedule referred to in these Letters Patent and making part of the same.

TO ALL WHOM IT MAY CONCERN:

Be it known that I, FRANKLIN G. HOLLAND, of the city of Washington, and District of Columbia, have invented a new and improved Metallic Paint; and I do hereby declare the following to be an exact description thereof, reference being had to the following-named ingredients, in their several proportions and quanties.

I use one bushel of hydraulic cement; one-half bushel of poco metallic paint; one quart of gum-asphaltum; one quart of Japan varnish, and mix the above ingredients in boiled linseed-oil, to bring to a working state.

This metallic paint is most useful for walls, or any structure through which dampness would penetrate, and prevents the walls from becoming damp.

What I claim as my invention, and desire to secure by Letters Patent, is—

The combination of the within-named ingredients, mixed in the several proportions as herein described, and for the purposes set forth.

FRANKLIN G. HOLLAND.

Witnesses:
 J. D. MAYHEW,
 EDM. F. BROWN.